United States Patent
Qin et al.

(10) Patent No.: US 9,991,658 B2
(45) Date of Patent: Jun. 5, 2018

(54) BRUSH ASSEMBLY

(71) Applicant: Johnson Electric S.A., Murten (CH)

(72) Inventors: Rui Feng Qin, Hong Kong (CN); Yi Jing, Shenzhen (CN); Hai Feng Shi, Shenzhen (CN)

(73) Assignee: Johnson Electric S.A., Murten (CH)

( * ) Notice: Subject to any disclaimer, the term of this patent is extended or adjusted under 35 U.S.C. 154(b) by 329 days.

(21) Appl. No.: 14/705,331

(22) Filed: May 6, 2015

(65) Prior Publication Data
US 2015/0326099 A1 Nov. 12, 2015

(30) Foreign Application Priority Data

May 6, 2014 (CN) .......................... 2014 1 0189277
Nov. 6, 2014 (CN) .......................... 2014 1 0623453

(51) Int. Cl.
*H01R 39/38* (2006.01)
*H02K 13/00* (2006.01)
*H01R 39/40* (2006.01)

(52) U.S. Cl.
CPC ........... *H01R 39/40* (2013.01); *H01R 39/385* (2013.01); *H02K 13/00* (2013.01)

(58) Field of Classification Search
CPC ....... H01R 39/40; H01R 39/385; H02K 13/00
USPC ................................................. 310/232–253
See application file for complete search history.

(56) References Cited

U.S. PATENT DOCUMENTS

| 6,127,759 | A | * | 10/2000 | Tanaka | H01R 39/32 310/179 |
| 8,154,169 | B2 | * | 4/2012 | Qin | H01R 39/40 310/239 |
| 2005/0242683 | A1 | * | 11/2005 | Lau | H01R 39/381 310/239 |
| 2010/0038990 | A1 | * | 2/2010 | Qin | H01R 39/40 310/242 |

FOREIGN PATENT DOCUMENTS

| CN | 102593998 A | 7/2012 |
| CN | 202395610 U | 8/2012 |

OTHER PUBLICATIONS

English machine translation of CN 102593998; Jul. 2012; Baofa Ma; China.*
English machine translation of CN101515734; Aug. 2009; Baofa Ma; China.*

* cited by examiner

*Primary Examiner* — Bernard Rojas
*Assistant Examiner* — Ahmed Elnakib
(74) *Attorney, Agent, or Firm* — Muncy, Geissler, Olds & Lowe, P.C.

(57) ABSTRACT

An electric power steering assembly includes a motor which includes a brush assembly. The brush assembly includes a brush base, a plurality of brush units and a plurality of fixing units for fixing the brush units to the brush base. The brush unit includes a brush, a guide rail and a spring. The rail includes two guiding arms, a closed end interconnecting the guiding arms and wings extending from free ends of the guiding arms. Grooves in the brush receive the guiding arms. The fixing unit includes a first fixture and a second fixture. The closed end of the guide rail engages the first fixture. The second fixture includes two columns spaced (Continued)

from each other. Each column defines a slot in a top end. Protrusions extend from a side of each slot to lock the wings in the slots.

16 Claims, 9 Drawing Sheets

BRUSH ASSEMBLY

CROSS REFERENCE TO RELATED APPLICATIONS

This non-provisional patent application claims priority under 35 U.S.C. § 119(a) from Patent Application No. 201410189277.3 filed in The People's Republic of China on May 6, 2014 and from Patent Application No. 201410623453.X filed in The People's Republic of China on Nov. 6, 2014, the entire contents of which are hereby incorporated by reference.

FIELD OF THE INVENTION

This invention relates to electric motors and in particular, to a brush assembly for a brush type electric motor.

BACKGROUND OF THE INVENTION

Figure 1:
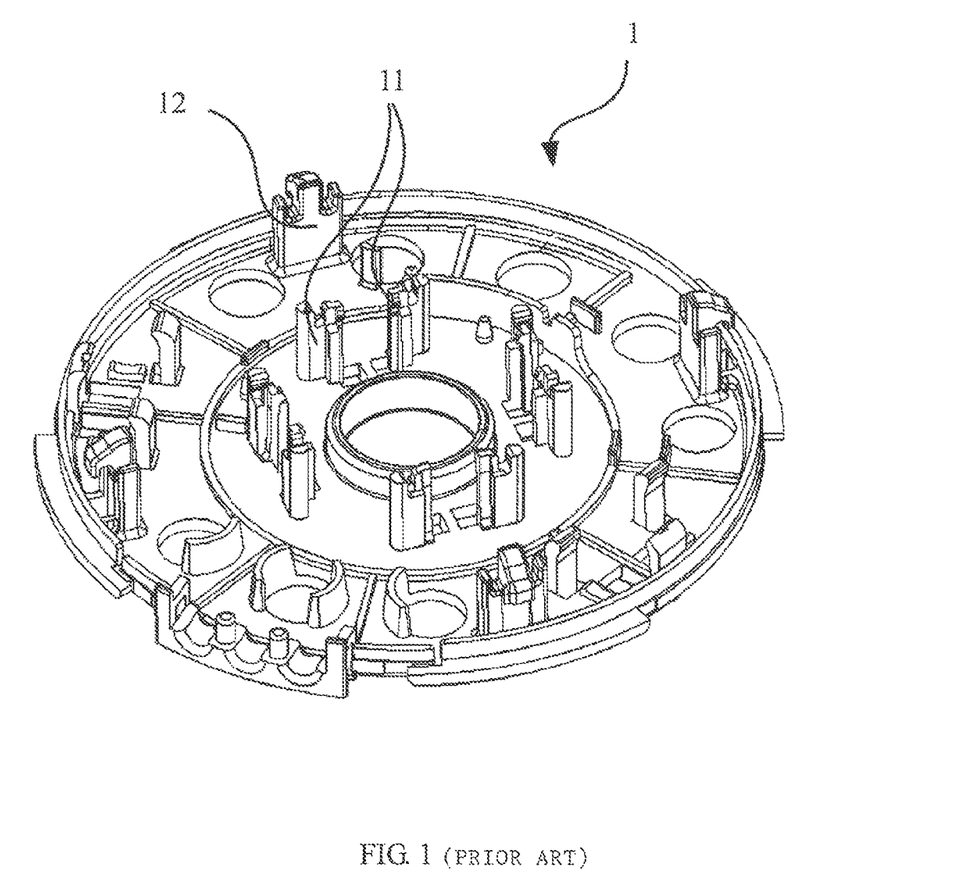
FIG. 1 illustrates a brush base of a known brush assembly.
Figure 2:
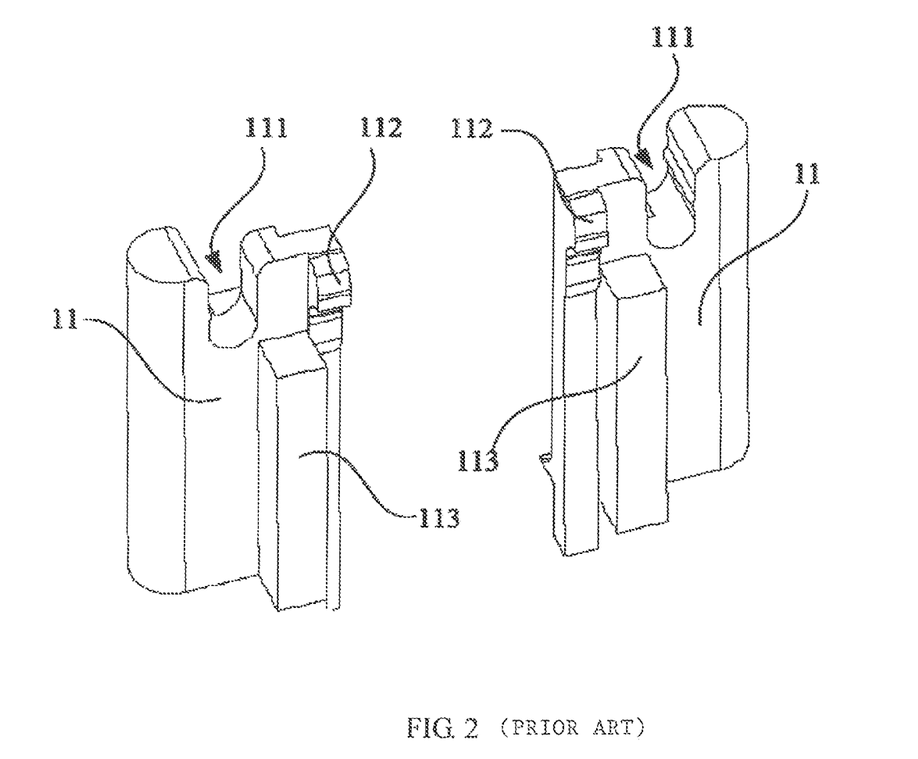
FIG. 2 illustrates inner fixtures of the brush base of FIG. 1.
Figure 3:
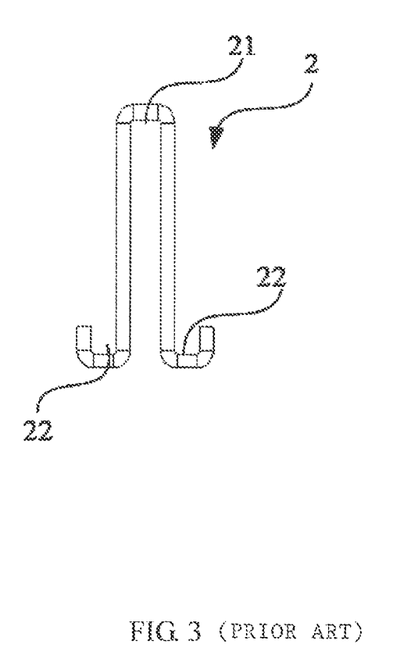
FIG. 3 shows a rail of the known brush assembly.

A known brush assembly has a brush base and a plurality of brush units. The brush base has a through hole in a central portion thereof through which a rotary shaft extends. The brush units are mounted around the through hole to engage a commutator on the shaft. Each of the brush units includes a brush, a generally U-shaped rail, and a spring mounted around the rail. The brush unit is fixed to the brush base by the rail. As shown in FIGS. 1-3, the brush base 1 forms a plurality of outer fixtures 12 for fixing closed ends 21 of the rails 2, and a plurality of pairs of inner fixtures 11 for fixing free ends 22 of the rails 2. In detail, when the rail 2 is assembled to the brush base 1, the closed end 21 of the rail 2 is engaged in a groove of the corresponding outer fixture 12, and then the two free ends 22 of the rail 2 are pushed down to squeeze protrusions 112 of the corresponding pair of inner fixtures 11 to make the inner fixtures 11 deform elastically, whereby the free ends 22 of the rail 2 can slide past the protrusions 112 and then being locked in a space between the protrusions 112 and platforms 113, with the free ends 22 of the rail 2 being disposed in grooves 111 of the inner fixtures 11.

Such fixing construction of the rail described above is applicable to a brush base which is soft and elastic, and situations of not high temperature. Since the rail 2 cannot elongate in the radial direction, the protrusions 112 of the inner fixtures 11 are easily broken or damaged by the free ends 22 of the rail 2 if the inner fixtures 11 are made of high hardiness materials, such as PPS (Polyphenylene sulfide), which results in the rail 2 being not sufficiently rigidly fixed allowing excessive movement of the brush during use. In addition, such fixing construction cannot endure high temperature, and thus is not suitable for use in a totally enclosed, high power motor.

Hence there is a desire for an improved brush assembly for an electric motor.

SUMMARY OF THE INVENTION

Accordingly, in one aspect thereof, the present invention provides a brush assembly for a brush motor, comprising: a brush base; a plurality of brush units fixed on the brush base, each of the brush units comprising a brush, a guide rail, and a spring, the guide rail comprising two guiding arms, a closed end interconnecting the guiding arms, and wings extending respectively from free ends of the guiding arms, the brush having guide grooves for receiving the guiding arms; and a plurality of fixing units for fixing the brush units to the brush base, each fixing unit comprising a first fixture and a second fixture, the closed end of the guide rail being, engaged with the first fixture, the second fixture comprising two columns spaced from each other, each of the columns having a slot in a top end thereof, and a protrusion extending from a lateral side of each slot into the corresponding slot, the wings being respectively locked in the slots by the protrusions.

Preferably, the guide rail is approximately W-shaped.

Preferably, the guiding arms of the guide rail define an angle C there between when in a relaxed state.

Preferably, the angle C between the guiding arms is between 2 and 5 degrees.

Preferably, the protrusions of the two columns of the second fixture extend towards each other, and a distance between the guiding arms, in the relaxed state, increases from the closed end to the wings.

Preferably, the columns of the second fixture resiliently deform the guide rail, when assembled, such that the guiding arms are parallel and press against the columns.

Preferably, the first fixture forms a fixing pole having two grooves being approximately U-shaped and having a hook between the grooves, the hook being formed on a radially outer side of the fixing pole.

Preferably, a top of an outer face of the hook is curved or inclined.

Preferably, each column of the second fixture has a platform at a side thereof facing the free ends of the guide rail and adjacent to the slot.

Preferably, a top side of the platform is at the same level as a bottom of the slot.

Preferably, the columns of the second fixture each have a curved or inclined inner face at a top thereof.

Alternatively, the protrusions of the two columns of the second fixture extend away from each other, and a distance between the guiding arms decreases from the closed end to the wings.

According to a second aspect, the present invention provides an electric motor, incorporating a brush assembly as described above.

According to a second aspect, the present invention provides an electric power steering assembly for a vehicle, incorporating a motor as described above.

BRIEF DESCRIPTION OF THE DRAWINGS

A preferred embodiment of the invention will now be described, by way of example only, with reference to Figures of the accompanying drawings. In the Figures, identical structures, elements or parts that appear in more than one Figure are generally labeled with a same reference numeral in all the Figures in which they appear. Dimensions of components and features shown in the Figures are generally chosen for convenience and clarity of presentation and are not necessarily shown to scale. The Figures are listed below.

DETAILED DESCRIPTION OF THE PREFERRED EMBODIMENTS

Figure 4:
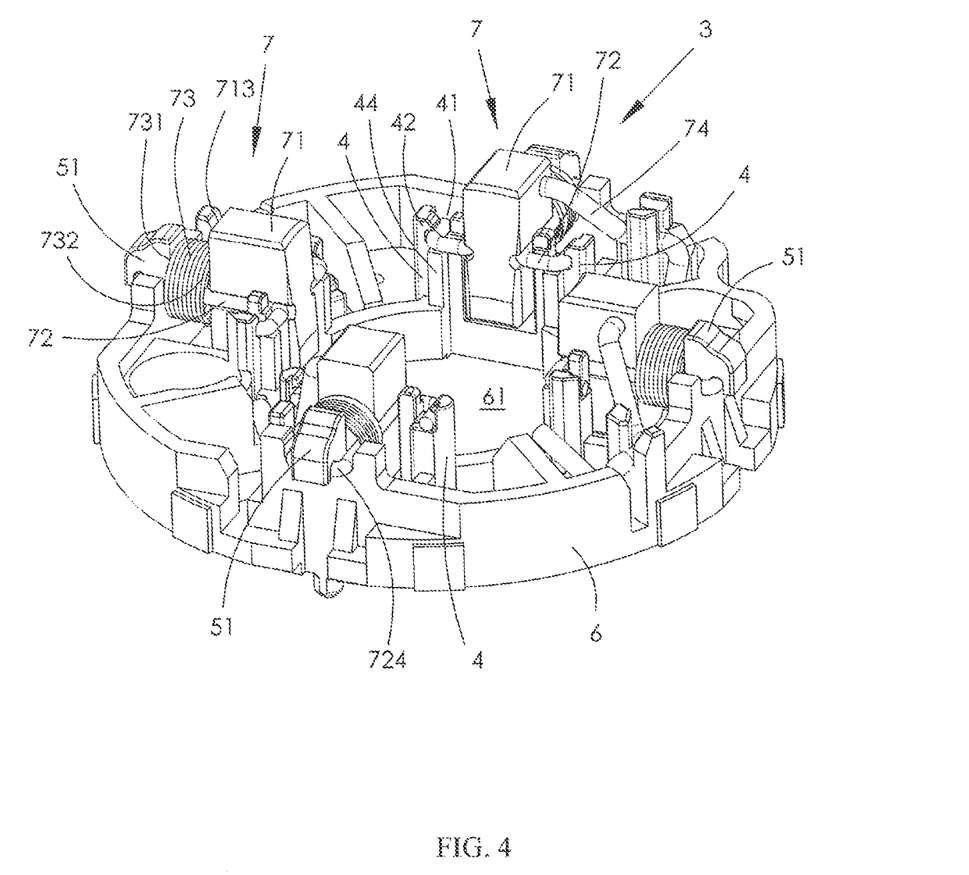
FIG. 4 illustrates a brush assembly according to the preferred embodiment of the present application.

Referring to FIG. 4, the brush assembly 3 according to the preferred embodiment of the present application includes a brush base 6 and a plurality of brush units 7 which are fixed to the brush base 6. The base 6 defines a through hole 61 in a central portion thereof to receive a rotor shaft of an electric motor. The brush units 7 are mounted around the through hole 61 to engage with a commutator fixed to the rotor shaft. Each brush unit 7 is fixed on the base 6 by a fixing unit. In this embodiment, the brush assembly 3 includes four brush units 7. Of course, the number of brush units 7 may be changed according to need, such as two, six, eight or more.

Figure 5:
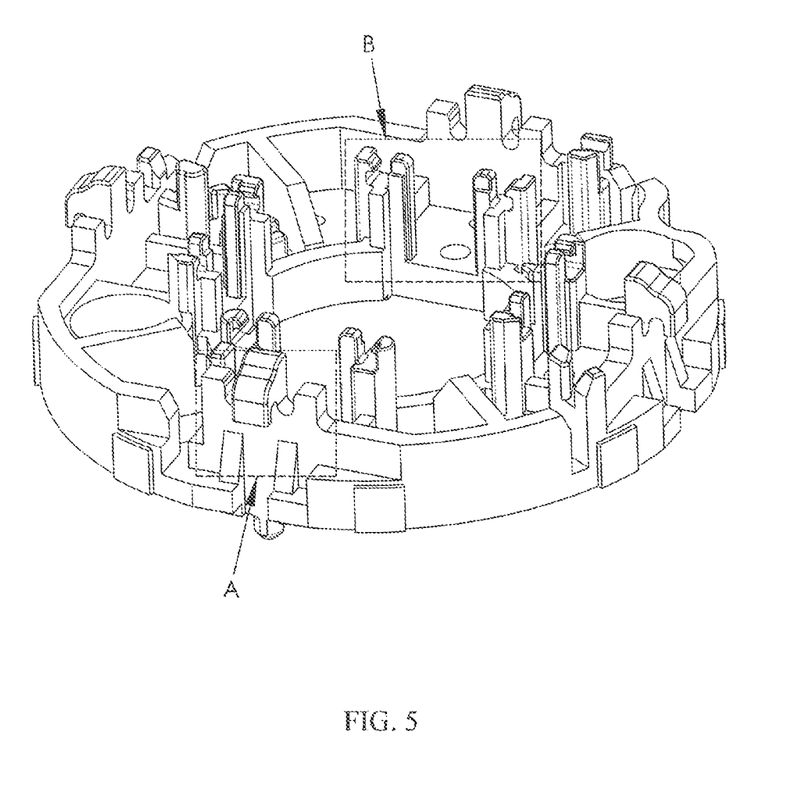
FIG. 5 shows a brush base of the brush assembly of FIG. 4.
Figure 6:
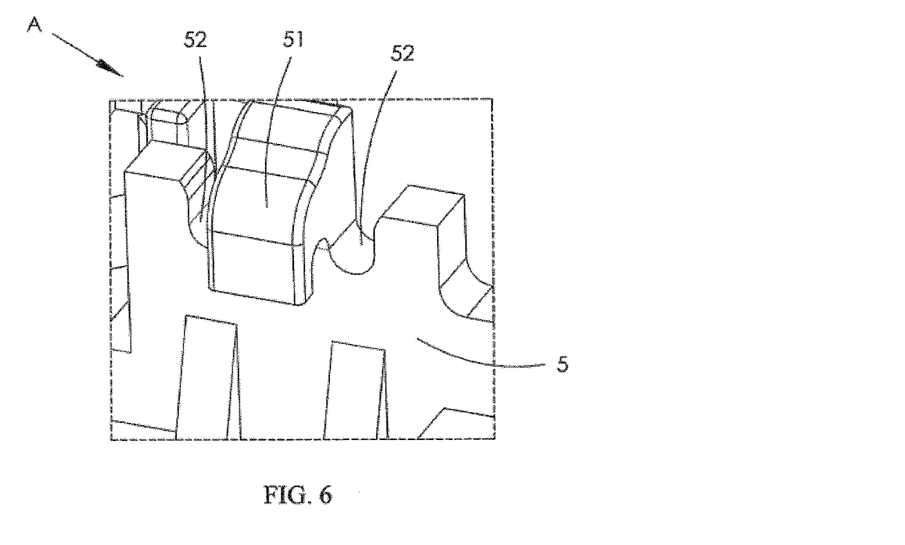
FIG. 6 is an enlarged view of portion A of FIG. 5.
Figure 7:
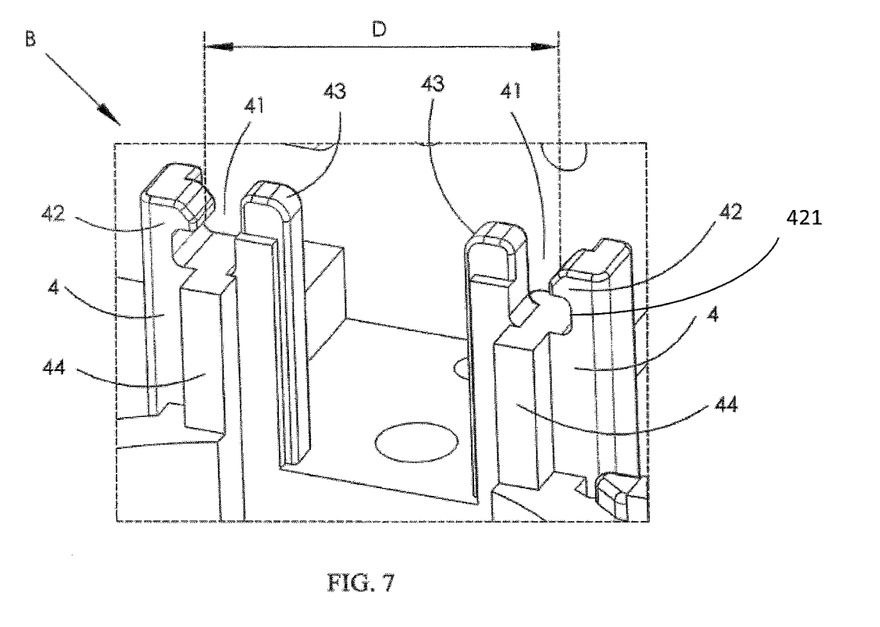
FIG. 7 is an enlarged view of portion B of FIG. 5.

Referring also to FIGS. 5-7, the brush base 6 has four fixing units. Each of the fixing units includes a first fixture A and a second fixture B. The first fixture A forms a fixing pole 5 at a top end thereof. The fixing pole 5 has a profile being generally III-shaped, and two locking grooves 52 are defined at lateral sides of the fixing pole 5 in a circumferential direction. Each of the locking grooves 52 is generally U-shaped. The fixing pole 5 further forms a hook 51, which is located between the locking grooves 52 and at a radially outer side of the fixing pole.

The second fixture B includes two columns 4 which are symmetric to (mirror images) and spaced from each other. Each of the columns 4 defines a generally U-shaped slot 41 in a top end thereof, and a protrusion 42 extends from a top of a lateral side of each slot 41 into the corresponding slot 41. A hook portion 421 is formed between the protrusion 42 and a bottom of the slot 41.

Figure 8:
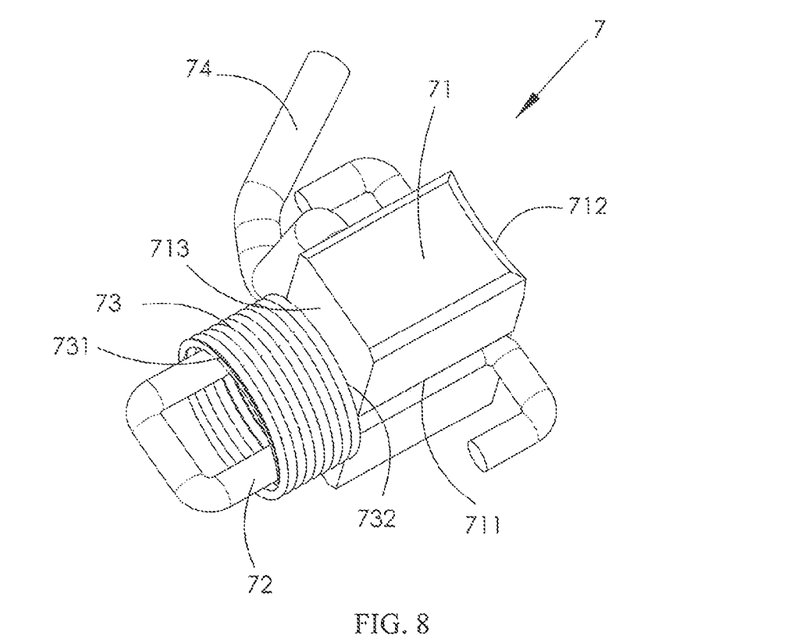
FIG. 8 illustrates a brush unit of the brush assembly of FIG. 4.

Referring to FIG. 8, each of the brush units 7 includes a brush 71, a guide rail 72 and a spring 73. The brush 71 is a carbon based mass with a generally rectangular prism shape, and has a first face 712 adapted to make sliding contact with the commutator, a second face 713 opposite the first face 712 for abutting the spring 73. The brush 71 has guide grooves 711 in opposite lateral faces thereof. In this embodiment, an embedded shunt 74 of the brush 71 is connected to one of the lateral faces transversely. The embedded shunt 74 can be connected to the brush 71 in a radial direction or an axial direction in other embodiments.

Figure 9:
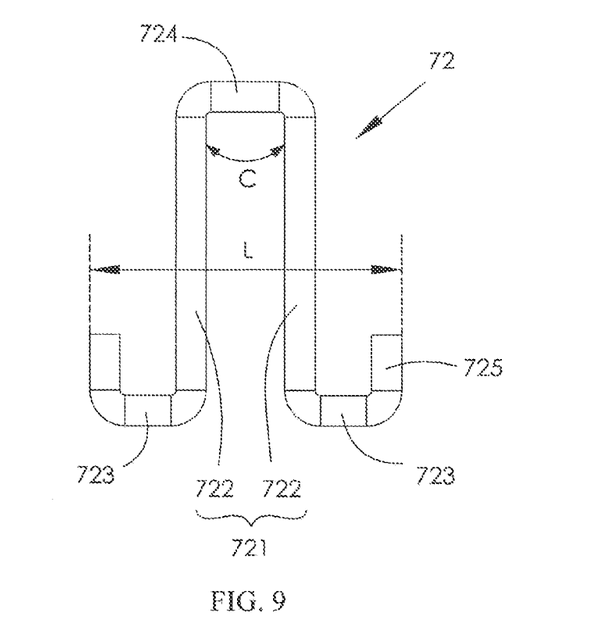
FIG. 9 shows a rail of the brush unit of FIG. 8.

Referring to FIG. 9, the guide rail 72 is generally W-shaped. Preferably, the rail 72 includes an U-shaped main body 721 and two wings 723 extending outwardly from two free ends of the main body 721, respectively. The main body 721 includes two guiding arms 722 and a closed end 724 interconnecting the guiding arms 722 at a side remote from the wings 723. The wings 723 extend respectively from the free ends of the main body 721. In this embodiment, each of the wings 723 is generally U-shaped. In the relaxed state, before assembly, the two guiding arms 722 of the rail 72 define an angle C there between, which is preferably 2-5 degrees, such that the arms are slightly divergent.

In this embodiment, the angle C between the guiding arms 722 faces internally of the motor. A distance between the guiding arms 722 gradually increases from the closed end 724 to the wings 723 under a free state. When the rail is mounted, the two columns 4 of the second fixture B will resiliently squeeze the rail such that the guiding arms are parallel and the arms will resiliently press against the columns to keep the arms parallel so that the brush can freely slide along the arms 722. Of course, the guiding arms 722 can be designed to be parallel when the rail 72 is relaxed. In a free state, a distance L (as shown in FIG. 9) of outer peripheries of the ends 725 of the wings 723 of the rail 72 is larger than a distance D (as shown in FIG. 7) between inner peripheries of the protrusions 42 of the columns 4.

When the brush assembly 3 is assembled to the brush base 6, the closed end 724 of the guide rail 72 is engaged with the hook 51 and grooves 52 of the first fixture A, and then free ends of the guiding arms 722 are resiliently pressed towards each other to make the distance L less than the distance D. In such a state, the wings 723 of the guiding arms 722 are pressed downwards to place the ends 725 of the wings 723 into the slots 41. After that, the force on the rail 72 is released, and the ends 725 of the wings 723 of the guide rail 72 move outwards to lock with a bottom of the protrusions 42. Thus, the guide rail 72 is fixed between the columns 4 of the second fixture B, and guiding arms 722 of the rail 72 are maintained parallel by the columns 4. On the one hand, the guiding arms 722 guide the brush 71 and facilitate the sliding movement of the brush 71 along the guiding arms, and thus the brush 71 can be firmly assembled onto the brush base 6. On the other hand, the resiliently deformed guiding anus 722 provide an outwards force, which makes the wings 723 lock with the protrusions 42 firmly. In use, the brush prevents the guiding arms from being deformed inwardly thus preventing the wings from being released from the slots 41. Such an assembly mode utilizes resilient deformation of the guiding arms 722, to avoid damaging the locking projections at the free ends of the guiding arms, facilitating assembly of the guide rail 72. Accordingly, damage of the fixtures of the brush base 6 as occurs in the art is avoided, which improves yield. Preferably, the guide rail 72 is made by bending a metal rod or pin.

When the guide rail 72 is fixed to the base 6, the brush 71 is then mounted between the guiding arms 722 of the rail 72. In detail, the guiding arms 722 of the rail 72 are respectively received in the guide grooves 711 of the brush 71, for locating and guiding movement of the brush 71. The spring 73 is a coil spring 73 which has a first end 731 and a second end 732. The spring 73 is mounted onto the rail 72 from the closed end 724, and the second end 732 of the spring 73 abuts against the second face 713 of the brush 71.

Preferably, after assembly, the outer periphery of the bending end 725 of each wing 723 of the guide rail 72 is spaced from the lateral side of the corresponding slot 41 and defines a gap there between. Thus, the lateral side of the slot 41 does not press the bending end 725 of the wing 723 to avoid the wing 723 of the guide rail 72 clamping the brush 71 tightly. Accordingly, movement of the brush 71 is not blocked.

The first end 731 of the spring 73 abuts the first fixture A and second end 732 of the spring 73 abuts the second face 713 of the brush 71, thereby urging the brush 71 from the guide rail and into sliding contact with the commutator.

Referring to FIGS. 4-5 and FIG. 7, the column 4 may form a platform 44 at an inner side thereof adjacent to the free ends of the guide rail 72. The platform 44 is adjacent the U-shaped slot 41. A top face of the platform 44 is at the same level as the bottom of the slot 41. As shown in FIG. 4, the wings 723 of the guide rail 72 are mounted on and supported by the platform 44, thereby improving a stability of the guide rail 72 and avoiding vibration during movement of the brush 71.

Preferably, a top of each column 4 of the second fixture B may have a curved inner face 43, allowing the rail 72 to slide smoothly into the space between the columns 4. In addition, the hooks 51 and the protrusions 42 may have curved faces to facilitate assembly. It should be understood that the curved faces can be replaced by inclined faces.

In this embodiment, the angle C defined between the guiding arms 722 of the guide rail 72 faces the internal of the motor, i.e., the guiding arms 722 expand from the closed end 724, and the protrusions 42 of the columns 4 are oriented towards each other. During assembly, the guiding arms 722 are pressed towards each other to be parallel to form an outwards force after the brush assembly 3 being assembled, thereby clamping the protrusions 42 firmly and avoiding disengaging.

Alternatively, the angle C between the guiding arms 722 can face externally of the motor, i.e., the guiding arms 722 expand towards the closed end 724. Correspondingly, the protrusions 42 are formed on opposite lateral sides of the slots 41, i.e., the protrusions 42 each extend towards a direction away from the other. When assembled, the free ends of the guiding arms 722 adjacent to the wings 723 are moved away from each other to make the guiding arms 722 parallel, thus the guiding arms 722 form an inwards force when the brush assembly is fixed, thereby clamping the wings firmly by the protrusions 42.

Figure 10:
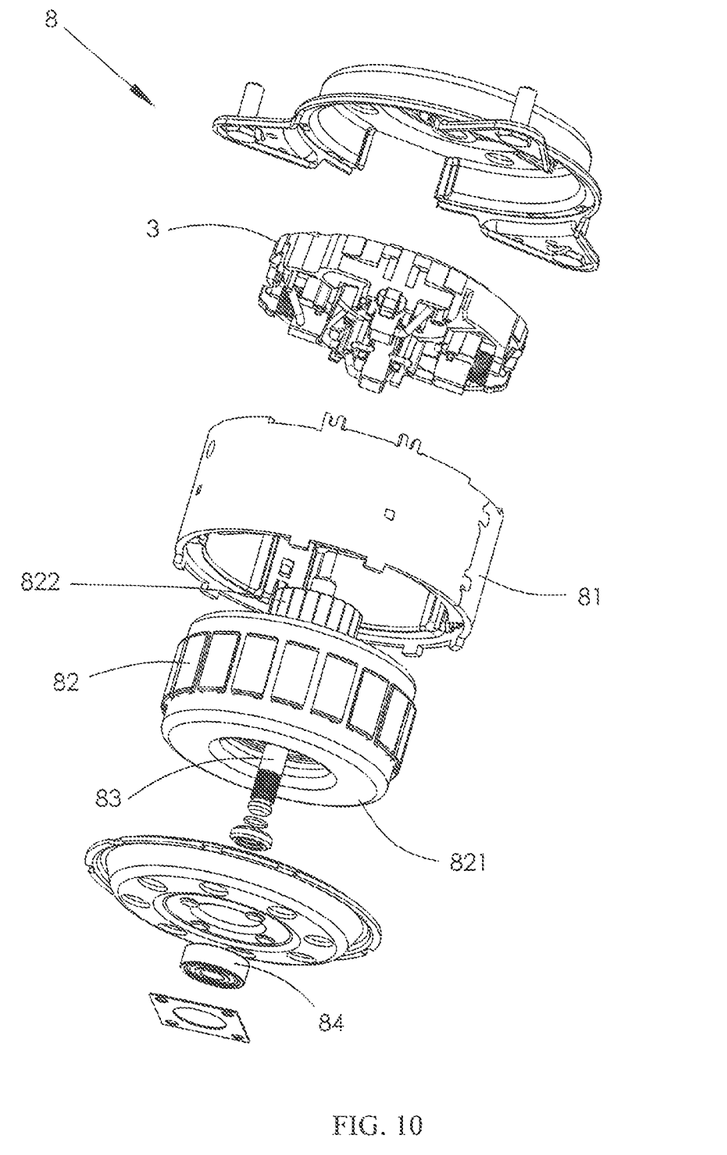
FIG. 10 is an exploded view of an electric motor incorporating the brush assembly of FIG. 4.

Referring to FIG. 10, the present application further provides an electric motor 8. The motor 8 includes a stator 81 and a rotor 82. The rotor 82 includes a shaft 83, a winding 821, and a commutator 822. The stator includes a housing, magnets fitted to the housing, end caps closing the housing and the brush assembly 3 described above. The brush assembly 3 transmits electric power to the windings 821 through the commutator 822. The rotor is connected to the stator by bearings 84 fitted to the end caps.

Figure 11:
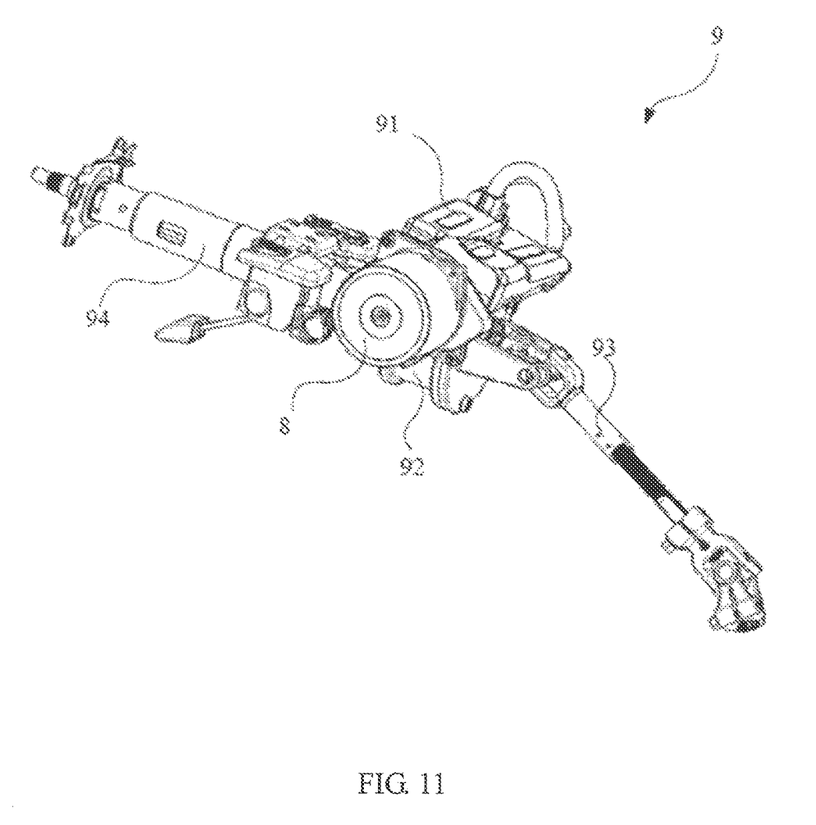
FIG. 11 illustrates an electric power steering assembly which incorporates an electric motor with the brush assembly of FIG. 4.

Referring to FIG. 11, the present application also provides an electric power steering assembly 9 for a vehicle, which includes a steering column 94, a gearbox, a sensor, the motor 8, an inter shaft 93, a controller 91 and a housing 92. The gearbox and the sensor are received in the housing 92. The motor 8 and the controller 91 are arranged on the housing 92. During operation of the electric power steering assembly 9, the sensor senses torque and direction of the steering wheel which is operated by a driver, and generates a corresponding signal to the controller 91. The motor 8 outputs torque under the control of the controller 91. The torque is then transferred to the inter shaft 93 by the gearbox. The inter shaft 93 thus drives a rack to move back and forth. The movement of the rack makes the wheel rotate around the kingpin, thereby realizing steering of the vehicle.

In the description and claims of the present application, each of the verbs "comprise", "include", "contain" and "have", and variations thereof, are used in an inclusive sense, to specify the presence of the stated item or feature but do not preclude the presence of additional items or features.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of example only, and various other modifications will be apparent to persons skilled in the field without departing from the scope of the invention as defined by the appended claims.

The invention claimed is:

1. A brush assembly for a brush motor, comprising:
a brush base;
a plurality of brush units fixed on the brush base, each of the brush units comprising a brush, a guide rail, and a spring, the guide rail comprising two guiding arms, a closed end interconnecting the guiding arms, and wings extending respectively from free ends of the guiding arms, the brush having guide grooves for receiving the guiding arms, the spring is mounted onto the two guiding arms; and
a plurality of fixing units for fixing the brush units to the brush base, each fixing unit comprising a first fixture and a second fixture, the closed end of the guide rail being engaged with the first fixture, the second fixture comprising two columns spaced from each other, each of the columns having a slot in a top end thereof, a protrusion extending from a top of a lateral side of each slot into the corresponding slot, a curved hook portion formed between the protrusion and a bottom of the slot, the wings of the guide rail being respectively locked in the slots by the protrusions and the curved hook portion, wherein the curved hook portion extends along the same lateral side as the protrusion.

2. The brush assembly of claim 1, wherein the guide rail is approximately W-shaped.

3. The brush assembly of claim 1, wherein the guiding arms of the guide rail define an angle there between when in a relaxed state.

4. The brush assembly of claim 3, wherein the angle between the guiding arms is between 2 and 5 degrees.

5. The brush assembly of claim 3, wherein the protrusions of the two columns of the second fixture extend towards each other, and a distance between the guiding arms increases from the closed end to the wings.

6. The brush assembly of claim 5, wherein the columns of the second fixture resiliently deform the guide rail such that the guiding arms are parallel and press against the columns.

7. The brush assembly of claim 1, wherein the first fixture forms a fixing pole having two grooves being approximately U-shaped and having a hook between the grooves, the hook being formed on a radially outer side of the fixing pole.

8. The brush assembly of claim 7, wherein a top of an outer face of the hook is curved or inclined.

9. The brush assembly of claim 1, wherein each column of the second fixture forms a platform at a side thereof facing the free ends of the guide rail and align with the U-shaped slot.

10. The brush assembly of claim 9, wherein a top side of the platform is at the same level as a bottom of the slot.

11. The brush assembly of claim 1, wherein the columns of the second fixture each have a curved or inclined inner face at a top thereof.

12. The brush assembly of claim 1, wherein a distance between the guiding arms decreases from the closed end to the wings.

13. An electric motor, incorporating the brush assembly of claim 1.

14. An electric power steering assembly for a vehicle, incorporating the motor of claim 13.

15. The brush assembly of claim 1, wherein the brush has a first face adapted to make sliding contact with a commutator, and a second face opposite the first face, the spring has a first end and a second end, the first end of the spring abuts the first fixture and the second end of the spring abuts the second face of the brush.

16. The brush assembly of claim 1, wherein an inner contour of the hook portion matches an outer contour of the guide rail.

\* \* \* \* \*